Jan. 23, 1962 R. A. PRITCHETT 3,018,374
METHODS OF AND MEANS FOR ASSAYING MATERIAL
HAVING A FISSIONABLE COMPONENT
Filed July 18, 1958 5 Sheets-Sheet 1
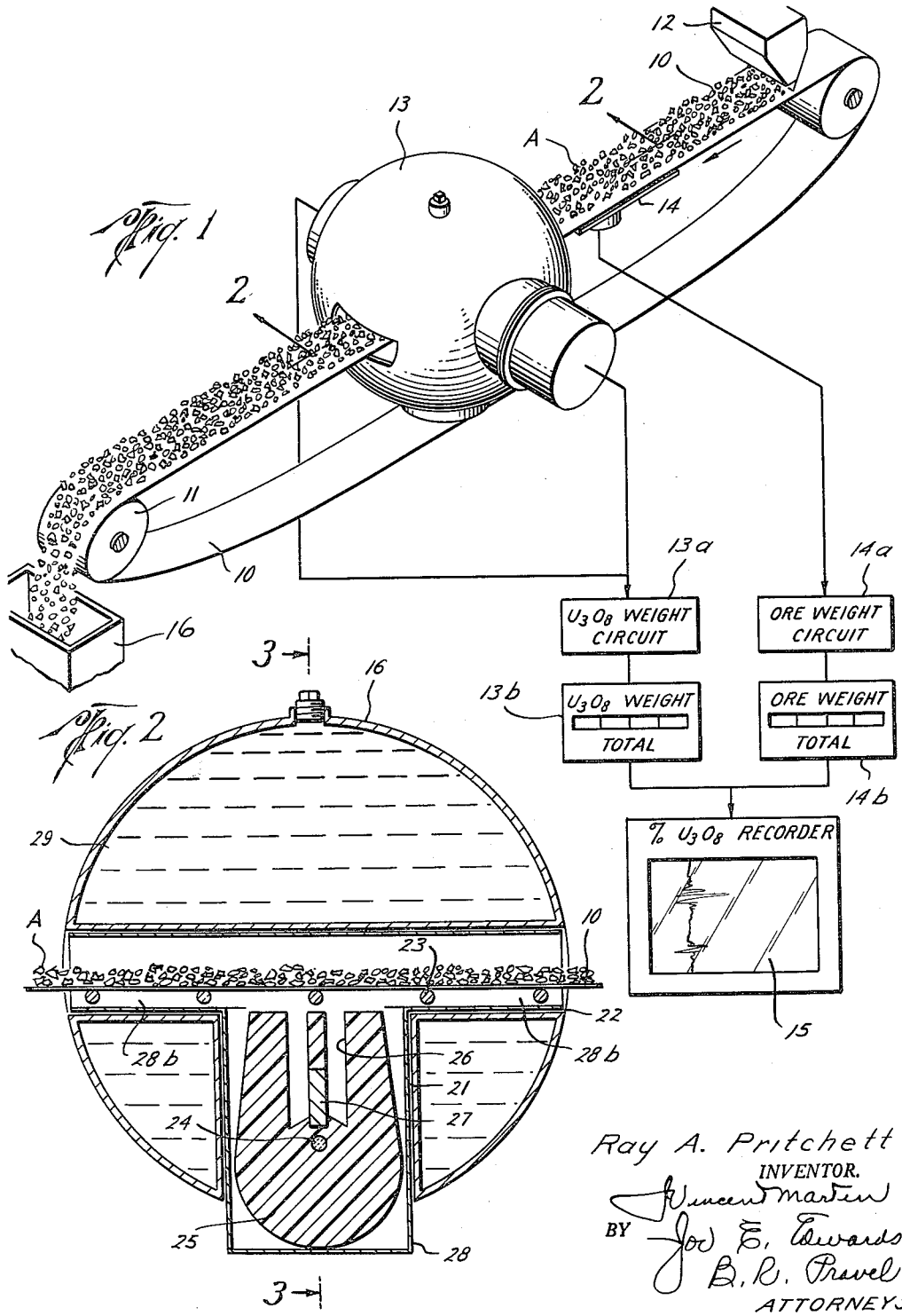
Ray A. Pritchett
INVENTOR.

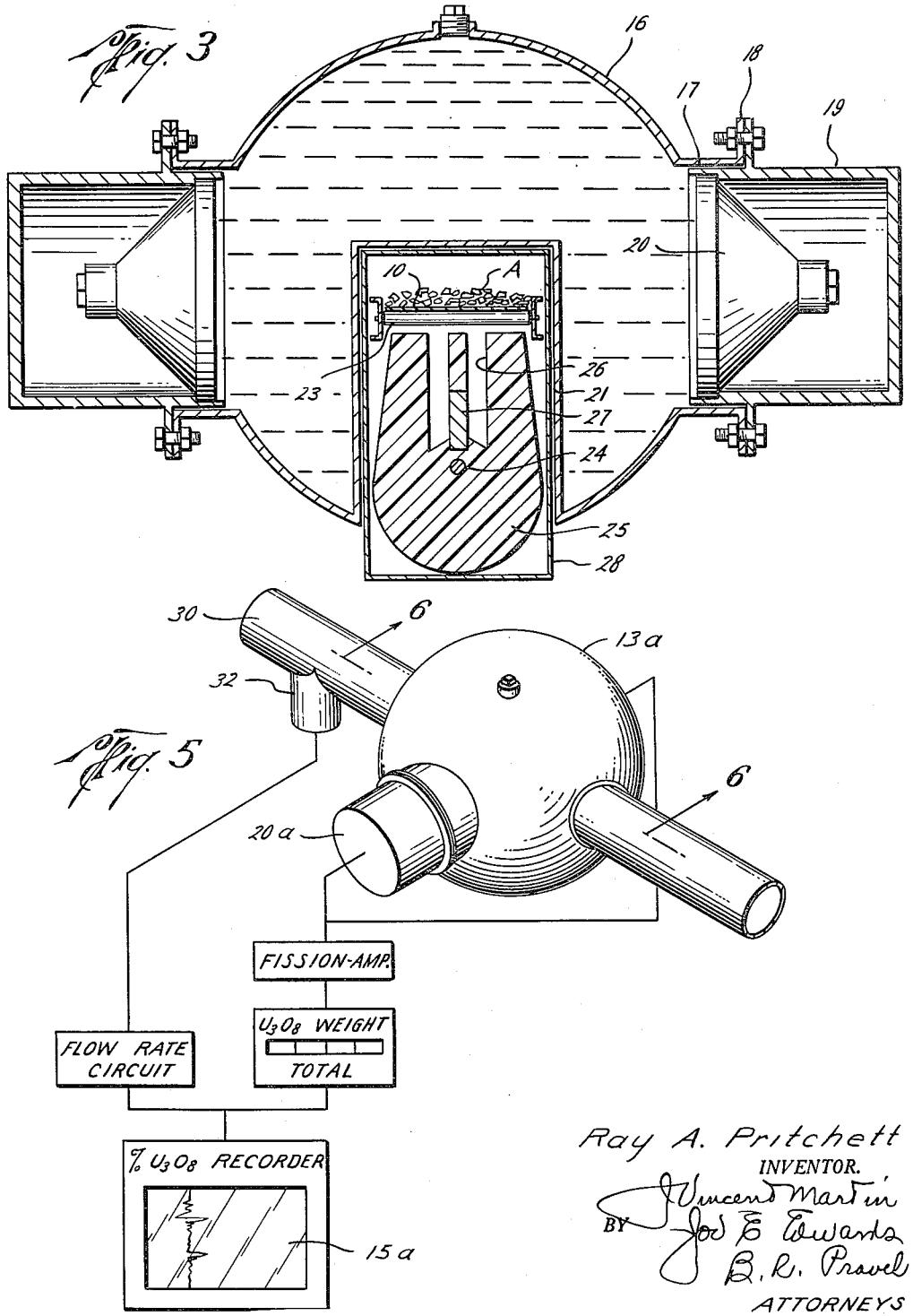

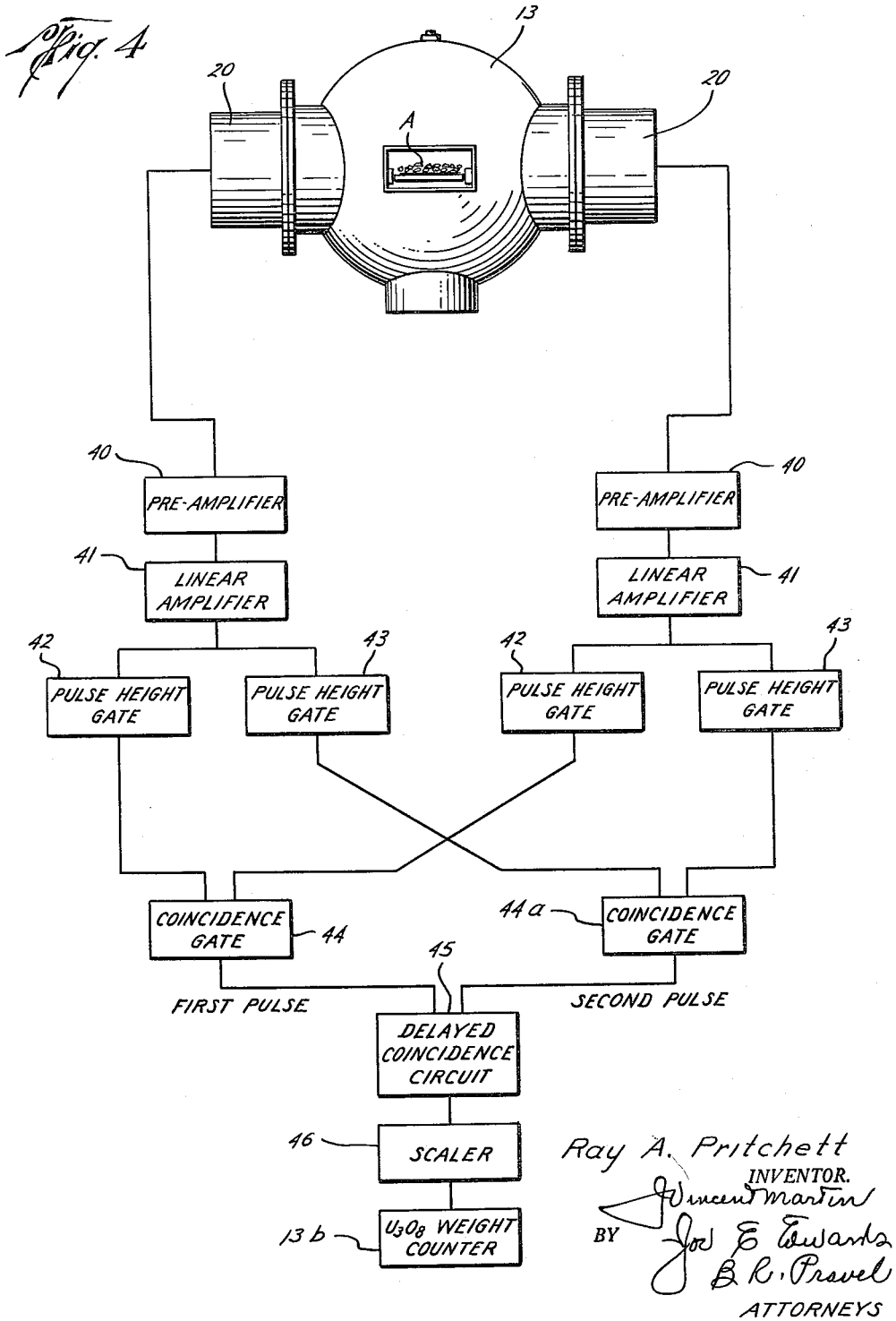

Jan. 23, 1962 R. A. PRITCHETT 3,018,374
METHODS OF AND MEANS FOR ASSAYING MATERIAL
HAVING A FISSIONABLE COMPONENT
Filed July 18, 1958 5 Sheets-Sheet 4
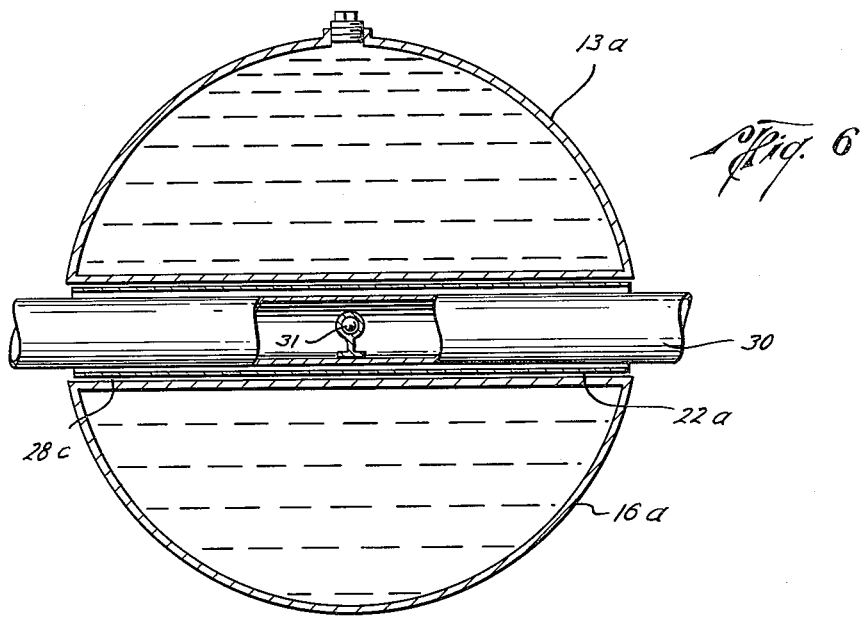
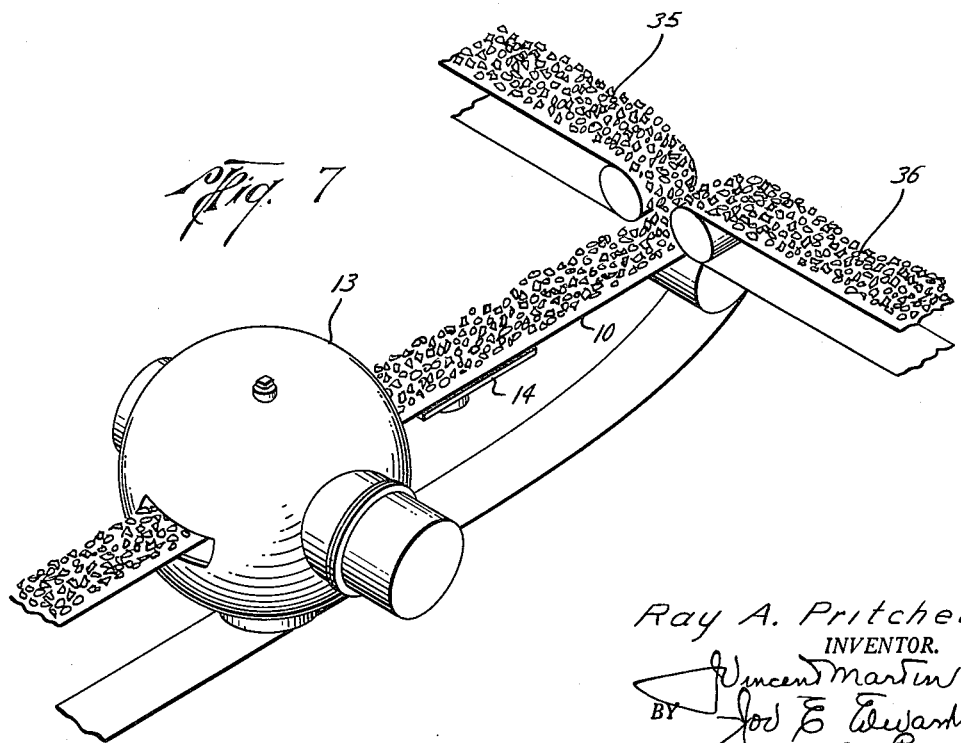
Ray A. Pritchett
INVENTOR.
ATTORNEYS Ray A. Pritchett
INVENTOR.

BY Browning, Simms, Hyer
& Eickenrohr

ATTORNEYS

United States Patent Office 3,018,374
Patented Jan. 23, 1962

3,018,374
METHODS OF AND MEANS FOR ASSAYING MATERIAL HAVING A FISSIONABLE COMPONENT
Ray A. Pritchett, Dallas, Tex., assignor to
Floyd V. Richardson, Dallas, Tex.
Filed July 18, 1958, Ser. No. 750,069
22 Claims. (Cl. 250—71.5)

This invention relates to new and useful improvements in methods of and means for assaying material containing both a fissionable and a non-fissionable component, particularly where the latter is capable of undergoing reaction with a thermal neutron. In one of its aspects, it relates to methods of and means for assaying ore having a component capable of undergoing fission upon bombardment with a neutron or other particle. In still another of its aspects, it relates to methods of and means for assaying uranium ore.

Heretofore, the assaying of materials having a fissionable component, such as uranium ore, has been accomplished through a number of different processes. One process has been chemical in nature, i.e. quantitative chemical analysis. This procedure is slow and costly and, moreover, its accuracy depends upon the representativeness of the sample assayed. Another process has been based upon the determination of natural gamma ray emissions or gamma-beta ray emissions, from the ore. The number of emissions per unit of time can then be correlated with percentage uranium content, the latter being determined by chemical analysis. Where the resulting ratio is constant, this method is usually reliable. However, the gamma ray emissions are not from the uranium compound per se ($U^{235}$, for example) but rather from the daughter products thereof. The principal hard gamma ray emission comes from the radium end of the series of daughter products and therefore this type of assay method is valid only for materials or ores in which the uranium is in equilibrium with its radioactive daughter products and for which the equilibrium ratio can be accurately determined. For many reasons, such as preferential leaching and weathering, the ratio of daughter products to uranium per se may vary widely from ore particle to ore particle so that any particular ore may have a high radium or radon content or it may have a deficiency of these daughter products, and a method based upon the measurement of such daughter products is, in such cases, an indirect method which has serious limitations, even to the point of providing erroneous readings. Moreover, the ratio must be accurately determined from time to time even where the equilibrium ratio tends to be constant.

It has been known that when natural uranium, composed of $U^{235}$ and $U^{238}$, is bombarded by thermal or slow neutrons, some of the $U^{235}$ isotope undergoes fission and emits, per fission event, on an average of about 2.5 fast neutrons and approximately 7.5 hard gamma rays. However, for one reason or another, this knowledge has never been employed in the assaying of fissionable materials containing impurities which also emit particles upon bombardment with thermal neutrons or other fission-causing particles. One reason for this may have been the problem of distinguishing between the two types of emissions, one from the fissionable component to be measured and the other from the impurity. Background radiation would also be a deterrent. Obviously, a total reading of emissive energy would lead to erroneous results.

By way of example, uranium ore is comprised not only of the fissionable $U^{235}$ but usually also contains varying amounts of silica. Upon bombardment of the ore with thermal neutrons, the $U^{235}$ isotope will undergo fission to emit on an average of 2.5 neutrons having a total energy of about 5 mev. Simultaneously, there is emitted on an average of 7.5 hard gamma rays having a total energy of 7.5 mev. Silica, on the other hand, upon capture of a thermal neutron, emits particles having a total energy of about 8.5 mev. Some authorities give a maximum energy of the gamma rays emitted by silica at 10.55. Since silica has a type 2 capture gamma ray spectrum, it will obviously emit gamma rays having energies equal or comparable to the energies of the fast neutrons and hard gamma rays emitted during the fission of the $U^{235}$. Therefore, differentiation between the fission events and the capture events cannot be a simple gating out of the undesired pulses.

Another problem which will frequently present itself in the fission assay of fissionable materials is that involving fast neutron background. Thus, most thermal neutron "sources" actually involve a fast neutron generator or source accompanied by a moderator which slows the fast neutrons to thermal energy levels. Any practical moderator is not 100 percent efficient in converting a fast neutron beam to a slow neutron beam. Therefore, the detector is subjected to fast neutrons from both the "thermal" neutron source and the fissioning material. A distinction between the two types of fast neutrons should be made for an accurate assay made under practical conditions, particularly where the number of fast neutrons from the source is relatively much greater than those originating from the fissionable material. Of course, a source which emits thermal neutrons only would avoid this problem.

While particular reference has been made above to assaying of uranium ore by determining its $U^{235}$ content, the principles of this invention are applicable to the assaying of other materials containing other fissionable isotopes, such as $U^{232}$, $U^{233}$, $Pu^{239}$, $Am^{241}$ and $Am^{242}$. It likewise is applicable to such materials which are in the solid state or in solution. Thus the invention will find broad application to the assaying of a fishionable component, or mixtures thereof, having one or more of a broad variety elements mixed or alloyed therewith such as occurs not only in ores, but in the processing of such ores to recover the fissionable component as well as assaying reactor fuel elements, detecting hidden fissile material, laboratory assaying of various materials containing fissionable elements, tracer studies and, in general, measuring the concentration of a fissionable material in a wide variety of environments.

It is therefore one object of this invention to provide an improved method of assaying a material having a fissionable component wherein a direct measurement is made from the particular fissionable component, rather than indirectly as by measurement of certain daughter products, the measurement being made rapidly instead of slowly as in chemical analysis.

Another object is to provide a method and apparatus for assaying a material containing a fissionable component wherein the total energy of the prompt fission neutrons, gammas, etc. is employed to differentiate from background radiation or from emissive events other than the desired fission events so that a count representing the fission events can be made.

Another object is to provide an improved method of and apparatus for assaying a material containing a fissionable component wherein the total energy of the fission event is employed to differentiate from the emissive events resulting from the thermal neutron reaction of other components of the material and particularly wherein the fission event results in two or more neutrons being emitted, each having an energy equal to or less than the total energy released by the thermal neutron capture reaction.

Another object is to provide an improved method and apparatus which is particularly adapted to assaying uranium ore containing silica or similar component wherein the uranium ore under investigation is bombarded by thermal neutrons which react with the fissionable isotope $U^{235}$ in the ore to initiate a limited fission reaction which is measurable to count the fission events despite the fact that some thermal neutrons are unavoidably capured by the silica or the like to cause emission of hard gamma rays having a total energy approximating or even exceeding that of the fission neutrons.

Another object is to subject the uranium ore or ore particle, to a thermal neutron beam and measure the fission rate, which rate is proportional to the uranium content of the ore whereby an accurate assay of the ore may be made.

Another object is to provide a method of and apparatus for assaying a material containing a fissionable component wherein the simultaneous emission of at least two energy particles by the fissionable material is utilized to distinguish the fission event from background or nonrelated radiation or from other types of emissive events.

From the above, it will be seen that a broad object of this invention is the measurement of fission events, induced by bombardment of a fissionable material with fission-causing energy particles, in the presence of interfering energy particles having no relation to the fission event.

Other objects, advantages and features of the invention will be apparent to one skilled in the art upon consideration of the specification, claims and the appended drawings wherein:

FIG. 1 is a schematic, isometric illustration of an ore assaying apparatus, constructed in accordance with the invention, for carrying out the improved method in assaying dry ore;

FIG. 2 is a longitudinal sectional view taken on the lines 2—2 of FIG. 1;

FIG. 3 is a transverse vertical sectional view taken on the lines 3—3 of FIG. 2;

FIG. 4 is a block diagram illustrating one electrical circuit which can be used as a part of the apparatus;

FIG. 5 is a partial schematic view illustrating an apparatus for carrying out the improved method and assaying a fissionable component in a contaminated solution thereof passing through a flow conduit;

FIG. 6 is a view taken on line 6—6 of FIG. 5;

FIG. 7 is a schematic isometric view illustrating the application of the apparatus shown in FIGS. 1 to 4 to a method for controlling the values in a final ore product.

Figure 8:
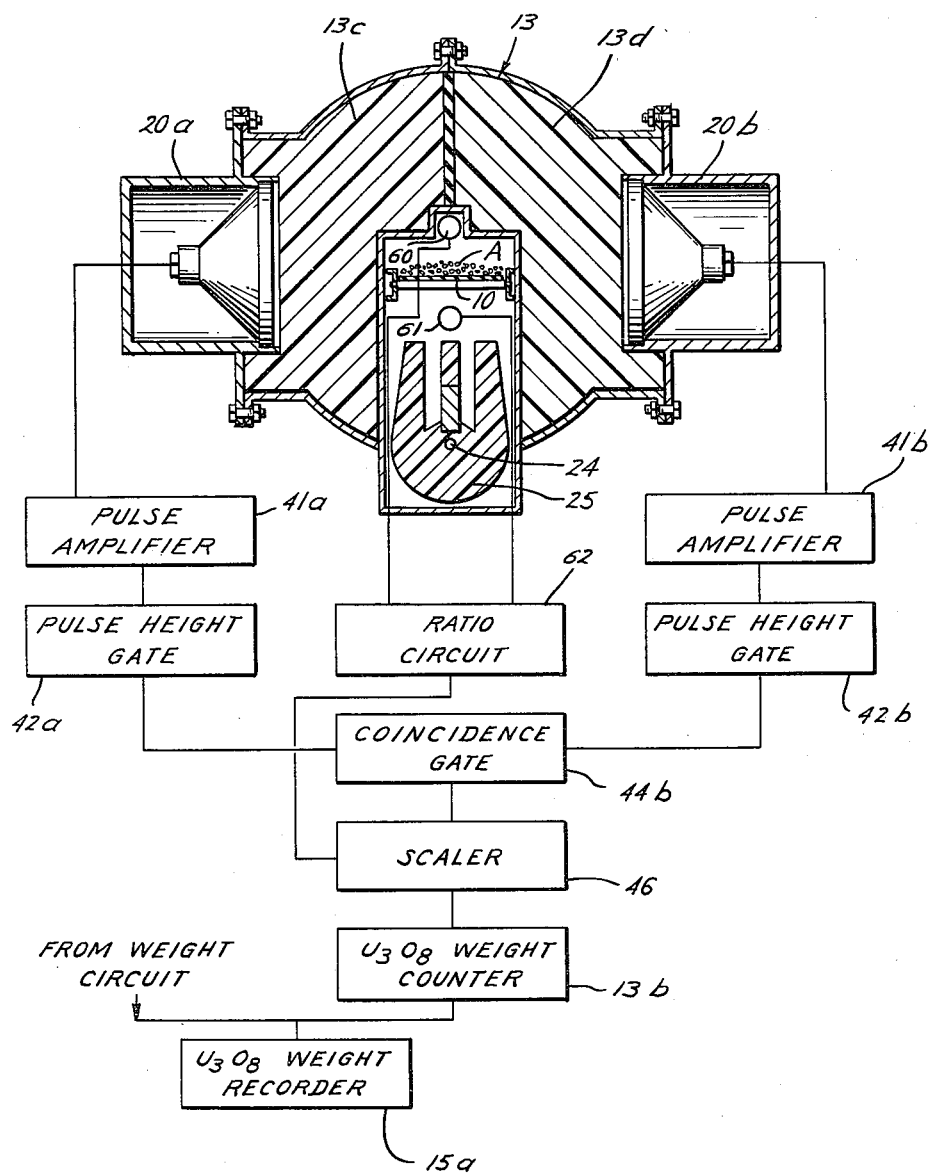
FIG. 8 illustrates another embodiment of the invention.

In the drawings the numeral 10 designates a conveyor which may be an endless belt mounted upon suitable rotating rollers 11, which may be driven in any desired manner at a predetermined speed. Ore particles A having a fissionable component, such as uranium ore, are adapted to be disposed upon the conveyor, being preferably fed thereto through an inlet hopper 12 or through any suitable conductor. Any desirable or well known means (not shown) may be provided for controlling the deposit of the particles upon the conveyor, and after deposit of said ore upon the conveyor, the ore is moved by the conveyor in the direction of movement of the conveyor as indicated by the arrow in FIG. 1.

As the conveyor 10 operates, the ore particles are moved along a longitudinal path and are caused to pass through a detector unit 13. As will be explained, the detector unit generates a signal which is proportional to the uranium content of the ore. A suitable electronic scale 14 is disposed beneath the belt conveyor 10 slightly in advance (or behind) of the unit 13 and as the ore passes over this scale it actuates the same, whereby an indication of the ore weight upon the scale is given. This weight measurement is related to the mass of the ore and is also indicative of the flow rate of the moving ore whereby the mass and size or volume of the ore may be ascertained from this measurement. The measurement of the uranium content of the ore, together with the determination of the mass of the ore particles provides information as to the uranium content to mass ratio of the ore (percent of uranium in the ore) and this information is utilized to actuate a recorder 15 through suitable electrical means. By obtaining the ratio of uranium content to mass, it is evident that an accurate assay of the ore under investigation is accomplished.

As illustrated in FIG. 1, the ore particles are merely carried along the conveyor 10 and are discharged into a suitable receiving hopper 16; however, it is pointed out that an acceptance and rejection of ore particles, in accordance with the determinations made could be employed in a manner similar to that disclosed in my copending application Serial Number 500,417, filed April 11, 1955, and the continuation-in-part thereof filed of even date herewith. As disclosed in such applications, the determination of an acceptable ore particle or sample actuates a mechanism which directs said particles to an acceptance chute or conductor, while any rejected ore particles or samples which do not have a predetermined acceptable assay value are discharged to a rejection conductor. As disclosed in the above-mentioned co-pending applications, it is preferred to segregate the ore into discrete sections so that the sections can vary in individual weight or the ore particles in each section can individually vary in size thereby avoiding the necessity for both sizing the particles all to be the same size and maintaining a constant weight of ore per increment of length of the conveyor. Where discrete sections are employed and the weight signal and detector signal are derived from different sections at the same time, suitable time delay or trigger circuits can be used so that the ratio of the weight signal to the detector signal influencing the recorder at any one time will be derived from the same section. Of course, if it is desirable only to assay a particular batch of ore, then the ore is merely passed through the apparatus and the recorder 15 provides information as to the total amount (e.g. pounds) of uranium contained in the batch.

The particular electronic scale 14 may be of any well known construction and is constructed to generate an electrical signal which is representative of ore weight. The signal is directed through an electrical circuit 14a and is utilized to actuate an indicator or recorder 14b which indicates or records the total ore weight. By electrical means the determinations made by the scale 14 and appearing on indicator or recorder 14b are fed to the recorder 15 in the manner schematically illustrated in FIG. 1.

The determination of the uranium content, as will be explained, is made electrically and the information is fed through a suitable electrical circuit 13a to an indicator or recorder 13b which records the uranium content, preferably in terms of weight. The indicator 13b has an electrical connection with the recorder 15 and thus the recorder 15 is actuated by the combined determinations made by the detector unit 13 and the scale 14. Actually the recorder 15 indicates the ratio of the weight of the uranium content to the over-all weight of the ore which has passed through the unit at any given time to provide information as to the total uranium content to total mass ratio. Since the scale 14 is outside of the detector unit housing 13, there is a slight difference in time in these two measurements and if desired this time delay may be taken care of in the electrical circuit so that the proper ratio is indicated by recorder 15. It is noted, however, that where a batch of ore is being directed through the apparatus the content of uranium to the total weight or mass of the batch is being determined and a small time difference in measurement of over-all weight and uranium content is not critical.

The preferred detector unit for measuring and indicating uranium content is clearly illustrated in FIGS. 2 and 3, and this unit includes a generally spherical casing 16 having diametrically opposed openings 17 surrounded by connecting flanges 18. Housings 19, each containing a photo-multiplier tube 20 or other radiation detector, are secured to the flanges 18. The tubes 20 are the measuring and indicating devices and are, of course, subject to variation; it has been found that a Dumont tube identified as K1328 is satisfactory for the purpose.

A recess or chamber 21 is formed within the central lower portion of the spherical housing 16 and the upper end of this chamber communicates with a transverse opening 22, the latter extending diametrically through the housing as shown in FIG. 2. The conveyor belt 10 on which the ore under investigation is disposed extends through the opening or passage 22 and is mounted upon suitable support rollers or idlers 23. In this manner the ore which is carried by the belt 10 is passed through the spherical housing 13 and traverses in overlying relationship the open upper end of the chamber 21 formed in the lower portion of the housing 16. Within the chamber 21 is mounted a neutron source 24, which is imbedded within a paraffin element 25, which has the general shape illustrated in FIGS. 2 and 3. The upper portion of the element 25 is formed with an annular bore 26 which extends downwardly from the upper end of the element to a point just above the neutron source 24. A copper post or member 27 is located immediately above the neutron source being imbedded in the paraffin element in any desired manner. Surrounding the paraffin element and disposed between this element and the wall of the chamber 21 is a thermal neutron shield 28, which may be constructed of boron, cadmium or other thermal neutron-absorbing material. As is clearly illustrated in FIG. 2, the shield 28 has an extension 28a and a second extension 28b which extend around the conveyor 10. The shield functions to confine the thermal neutrons which are emitted from the neutron source 24 therein to create a thermal neutron beam so as to assure that the thermal neutrons will bombard the ore particles A which are passing over the chamber 21 as the conveyor belt moves through the passage 22 of the housing 16 and to limit the number of thermal neutrons passing to the scintilllator of the detector.

Liquid phosphor 29 which is cadmium-loaded and described in greater detail below, is contained within the interior of the housing 16 and completely surrounds the chamber 21 as well as the passage 22. The particular neutron source 24 is subject to variation and may be in the form of a radium-beryllium, a polonium-beryllium, a plutonium-beryllium, a Van de Graaff electro-static generator, a Crockcroft-Walton generator cyclotron or other means of generating neutrons.

In the operation of the apparatus and the practice of the method, the ore particles A are carried along by the conveyor belt 10 and pass over the electronic scale 14 so that the weight of the ore upon the scale is measured and properly indicated. Upon entering the passage 22 of the housing 16, the ore particles are bombarded by the neutrons which are emitted by the neutron source 24. The particular arrangement illustrated in FIGS. 2 and 3 directs the neutrons into contact with the ore particles with the paraffin functioning as a moderator to slow down the fast neutrons emitted from source 24 so that actually the ore is subjected to a thermal neutron beam. Other moderators and arrangements can be used. Of course, if the generator or source initially produces thermal neutrons, the moderator can be omitted.

Due to the bombardment of the ore particles by the thermal neutrons, a limited fission is initiated and some of the $U^{235}$ isotope in the uranium ore undergoes fission, thereby releasing high energy fission neutrons and prompt fission gammas. The number of fission events will be proportional to the thermal neutron flux density and the number of fissionable atoms (e.g. $U^{235}$) disposed in the path of the neutron beam. By using a neutron beam of known constant density or of a known variable density, the number of fissionable atoms in the material being bombarded can readily be determined; that is, for example, if the flux density is constant, the number of fissions will be proportional to the absolute amount of fissionable material present. For uranium ore, the ratio of $U^{235}$ to $U^{238}$ is a known constant so that with knowledge of the amount of $U^{235}$ present, the amount of $U^{238}$ can be readily calculated.

The high energy fission neutrons and the prompt fission gamma rays pass through the slow neutron shield 21 into the scintillator. The latter is preferably comprised of a hydrogenous medium loaded with an element having a relatively large thermal neutron capture cross-section and capable of emitting relatively high energy capture gammas. A particular example is a mixture as follows:

|  | Parts by weight |
|---|---|
| Toluene | 781 |
| Terphenyl | 3 |
| Alpha naphthyl phenyl oxazole | 0.02 |
| Cadmium propionate | 74 |
| Methanol | 142 |

As the fast neutrons encounter the hydrogenous scintillator, they collide with one or more protons (hydrogen nuclei) so that the resulting release of proton recoil energy is substantially proportional to the energy of the fast neutrons. The resulting scintillations will therefore release a number of photons proportional to the sum of the proton recoil energy and the prompt fission gamma energy (about 12.5 mev. for $U^{235}$). The thermal neutron resulting from the proton recoil action is subsequently captured (usually within 1 to 9 microseconds, after reaching thermal level) by the cadmium which emits capture gamma rays of about 9 mev. total energy resulting in a second scintillation. These two pulses are detected by photo-multiplier tubes 20 or equivalent. The output of tubes 20 will therefore comprise (1) the two pulses mentioned above which are respectively of a height proportional to 12.5 mev. and 9 mev. for this particular system, (2) pulses resulting from capture gamma rays emitted by non-fissionable impurities in the material being bombarded upon capture of a slow neutron from the source (e.g. silicon emits gammas having about 8 to 10.5 mev. total energy), (3) any pulses resulting from unmoderated fast neutrons from the neutron source (background fast neutrons), (4) any pulses caused by capture gammas resulting from any thermal neutrons which may pass through both the bombarded material and the thermal neutron shield, and (5) any pulses resulting from detection of cosmic radiation which may penetrate a shield around the exterior of the scintillator. By suitable means, an example of which will be described below, this composite signal is converted to one representative only of the number of fission events occurring in the material being bombarded (this signal will be termed "fission signal").

For uranium ore, the fission signal is proportional to the amount of $U_3O_8$ in the ore sample and thus a detection and measurement is made of the $U_3O_8$ content of the ore particles.

The scale 14 which is actuated by the weight of the ore produces a signal which is representative of the ore weight or which may be said to represent the weight rate of movement of the ore and, as explained, this signal is also utilized to operate the recorder 15. The fission signal produced by detectors 20 and their associated circuits is representative of the rate of fission of the $U^{235}$ and is also proportional to the rate of movement of the $U_3O_8$ through the unit 13, and since both the fission signal and the weight signal together effect the operation of the recorder 15 (they can be mixed to provide a single signal which is proportional to the ratio of $U_3O_8$ weight to total ore weight), the $U_3O_8$ percentage of the ore being processed is measured and recorded on the recorder 15.

It is pointed out that the method of detecting the $U_3O_8$ content is directly dependent upon the number of fissions which occur by reason of the neutron bombardment of the ore particle. As mentioned, the bombardment of the ore with thermal neutrons results in the $U^{235}$ in the ore undergoing fission and by detecting the number of fissions the uranium content of the ore is accurately determined. As compared to other methods, this method is a direct method and no measurement of the daughter products need be made. The method has been found to be extremely accurate and overcomes the various disadvantages of the indirect types of measurements heretofore known.

It is evident that by determining the $U_3O_8$ content of the ore and at the same time obtaining a measurement related to the total weight or mass of that ore, an indication of the uranium content to mass ratio is obtainable. Since the mass of an ore particle with respect to its uranium content is of the utmost importance in accurate assaying, the method disclosed herein is extremely efficient in the determination of the ore value.

One of the features of the invention is the use of the photo-multiplier tubes 20, together with the particular electrical circuit illustrated in block diagram in FIG. 4. It is pointed out that there are several conventional means by which fission neutrons may be detected; for example, a hydrogenous radiator, when bombarded by fast neutrons, produces recoil protrons which may be detected by well known means. Also, fast neutrons may be slowed down to thermal energy and detected by a suitable counter, such as the well known $B^{10}F_3$ counter, or a counter using the neutron-alpha reaction.

However, in the present instance, the fission neutrons must be detected in the presence of a background of charged particles, gamma rays and other radiations, as described above, and it is desirable to utilize a method which will detect the neutrons with high efficiency in this background.

Referring to FIG. 4, which is the block diagram of the preferred electrical circuit, the signal is conducted from each photo-multiplier tube 20, which is, of course, viewing the liquid phosphor, to a preamplifier 40 and a linear amplifier 41, which function to amplify the signal. The amplified signal is then fed to two independent pulse height selecting gates 42 and 43, one of which is set to accept pulses characteristic of the recoil proton and the prompt fission gammas, while the other is arranged to accept pulses characteristic of the neutron-capture gammas produced in the cadmium. The output from the gates 42, which accept the pulses characteristic of the recoil proton, and prompt fission gammas, is fed to a coincidence circuit 44, while the output from the gate 43 is fed to a similar circuit 44a. The signals from the coincidence circuits 44 and 44a are then directed to a delayed coincidence circuit 45, which has connection through the scaler 46 with the indicator 13b.

When a pulse appears at the output of the "recoil proton" coincidence circuit 44, the delayed coincidence circuit 45 is triggered. If a second pulse appears at the output of the "neutron-capture gamma" coincidence circuit 44a within a predetermined time interval, such, for example, as one to ten microseconds, then the fission count is registered in the scaler 46. Since the number of uranium fissions detected is directly proportional to the weight of $U_3O_8$ in the sample, the indicator 13b may be calibrated in pounds of $U_3O_8$.

Thus it will be seen that the pulses arriving at gates 42 will include those whose height is proportional to the sum of the energies of the fast fission neutrons and the prompt fission gammas as well as pulses of lesser heights which are proportional to the energies of neutron capture gamma rays emitted by non-fissionable impurities, of unmoderated fast neutrons from the source (the source in this case being chosen so that its neutrons have an energy less than the total energy of the fission neutrons and prompt fission gammas), of capture gammas resulting from thermal neutrons passing through the shield, as well as the very high pulses resulting from cosmic radiation. By setting the window of gates 42 so that they tend to accept only pulses proportional to the total energy of the fission neutrons and prompt fission gammas, pulses of lesser and greater heights are prevented from triggering coincidence gate 44. Thus many of the pulses caused by background radiation are prevented from having any effect on the coincidence gate. Since this gate can be made to have a very short coincidence resolving time (e.g. 1 microsecond or less) and with gates 42 properly set, it can be triggered only by the substantially simultaneous arrival thereto of two pulses each of which theoretically will be of a height, assuming a linear system, proportional to one-half of the total energy of the fission neutrons and prompt fission gammas. Pulses proportional to one-half the total energy of any capture gammas from impurities in the material tested will be gated out by gates 42 and cannot trigger gate 44. However, due to the geometry of the system and the random nature of nuclear reactions, it is possible that one of tubes 20 will receive sufficient photons from an impurity capture gamma ray scintillation to provide an output pulse capable of passing through one of the gates 42. However, in that event, the pulse from the other tube will be insufficient to pass the other gate 42 and coincidence gate 44 will not be triggered.

Similarly, gates 43, which are set to accept pulses characteristic of the neutron capture gammas produced by the cadmium will reject pulses both higher and lower than their setting, thereby eliminating much of the unwanted background pulses. However, in this case, certain components of the material being bombarded may produce capture gammas having a total energy of the order of those produced by the cadmium-neutron reaction in the scintillator. If one of these pulses passes through each of pulse height gates 43, they will trigger coincidence gate 44a, causing it to emit a second pulse. If such event occurs after the pulse representing the neutron capture gamma produced by the cadmium has passed through the delayed coincidence circuit, it will have no effect on the count. If it occurs before, it will cause a count and the later arriving pulse representing the neutron capture gamma of the cadmium will have no effect. However, since the delayed coincidence circuit is triggered only by a pulse representing the detection of the fission neutron and the fission gamma rays, no error will be introduced.

If desired, pulse height gates 43, coincidence gate 43a, and delayed coincidence circuit 45 can be eliminated and coincidence gate 44 connected directly to the scaler. Here again gates 42 would be set to accept pulses proportional to the total energy of the fission neutrons and prompt fission gammas produced in the fission event and to exclude all other pulses. In this case, the window setting of gates 42 would have to be much narrower than in the circuit shown in FIG. 4 because the delayed coincidence circuit of FIG. 4 would not be present to prevent any unwanted pulses from being counted which have passed through gates 42 and which were not followed within the delay time of the delayed coincidence circuit by a pulse sufficient to trigger coincidence gate 44a.

It is also contemplated that the tubes 20 can be connected in series and the combined output, after amplification, passed to a pulse height gate set to accept pulses proportional to the total energy of the fission neutrons and prompt fission gammas produced in the fission event and to exclude all other pulses of greater or lesser magnitude. Such gate would then be connected directly to a counter. This type of operation is particularly feasible for use when assaying materials containing $U^{235}$ because the total energy of the fission neutrons and prompt fission gammas emitted by $U^{235}$ (about 12.5 mev.) is greater than the total energy emitted by any other known element upon undergoing a neutron capture reaction.

The foregoing detection arrangement has been found extremely efficient and accurate in detecting the fission rate and thereby providing for a determination of the percentage of $U_3O_8$ in ore. It is, of course, evident that although this arrangement has been found preferable, other types of indicators and electrical circuits may be employed, and so long as the measurement being made is a direct one, as distinguished from an indirect measurement, the purposes of this invention will be accomplished.

In FIGS. 1 to 4 the apparatus and method has been illustrated as applied to the assaying of ore particles in their dry state. However, the method and apparatus is just as applicable for assaying uranium in solution or in suspension, and in FIGS. 5 and 6 such an arrangement is shown. Referring to FIG. 5, a pipe or conduit 30, through which the uranium ore in solution is flowing, extends through a passage 22a formed in the detector unit 13a. The unit 13a is similar to the unit 13 in that it includes a spherical housing 16a having the passage 22a extending diametrically therethrough. The flow conductor 30 (FIG. 6) extends through the passage and has a neutron source 31 mounted therein. A suitable slow neutron shield 28c lines the passage 22a. The unit 13a, of course, includes detector tubes 20a of the same general type as those illustrated in the first form of the invention.

The operation of this form of apparatus is substantially as that heretofore described. The uranium in solution flowing through the conductor 30 passes into the unit 13a and is bombarded by thermal neutrons from the neutron source 31. No paraffin enclosure for the neutron source is necessarily required in this form since the aqueous solution in which the uranium ore is dissolved is utilized to moderate the neutrons. However, a carbon or hydrogenous moderator can be used to further reduce fast neutron background. The bombardment of the uranium in solution by thermal neutrons results in the $U^{235}$ in the uranium undergoing fission and the detectors 20a and their associated circuits function to detect and measure the fission rate and to produce a signal which is representative of the $U_3O_8$ content of the solution flowing past the neutron source. Such signal of course ultimately actuates a recorder 15a, which is similar to recorder 15 of the first form.

In this form of the invention the electronic scale 14 is omitted and in place thereof a flow-rate indicator 32 is provided in the conductor 30. This indicator produces an electrical signal which is proportional to the flow rate of the solution in the pipe. The signals from the flow-rate indicator and the signals from the detectors 20a are utilized to operate the recorder 15a which will visibly record the $U_3O_8$ content of the solution. It is evident that the uranium content to mass ratio is indicated on recorder 15a to provide an accurate assay of the uranium in solution. In both forms of the invention the method is a continuous one and accurate assaying may be accomplished in a minimum period of time.

Referring now to FIG. 8, there is shown another arrangement for the detection of fission events in the presence of other radiation. Here again the material A containing a fissionable component is passed through a detector 13 wherein it is bombarded by a beam of thermal neutrons as in FIG. 1. In this case, however, 2 pi geometry and a somewhat different coincidence counting technique are employed. Thus the detector unit 13 is comprised of two detectors 13c and 13d. These detectors should be selectively sensitive only to neutrons and insensitive to gammas and each can comprise a separate scintillator body such as a boron containing plastic phosphor or a silver activated zinc sulfide plastic phosphor. The scintillators should be optically isolated from one another so that tubes 20a and 20b each view only the scintillations occurring in their respective scintillators. The output of the tubes is fed respectively to pulse amplifiers 41a and 41b which are followed by pulse height gates 42a and 42b. The setting of these gates will be discussed below. The pulses accepted by the gates are fed to a coincidence gate 44b which is adapted to emit an output pulse whenever gates 42a and 42b emit pulses within the resolution time of the coincidence gate, which should be very short, of the order of one microsecond or less. The coincidence gate pulses may be passed to a scaler 46 and then to a counter 13b as described with reference to FIG. 4.

When a fission event occurs in the material A, there will be the simultaneous emission of at least two fast fission neutrons. Within the limitations of the geometry employed and the statistical nature of nuclear reactions on an average of one-half of the fission neutrons will pass into detector 13c and the other half into detector 13d. The resulting simultaneous pulses emitted by tubes 20a and 20b will pass through gates 42a and 42b, which are set to accept them, and cause coincidence gate 44b to emit a pulse. On the other hand, events associated with background radiation, such as neutron capture reactions, background fast and thermal neutrons, cosmic radiation, etc., will have a random distribution with time. If a background photon or neutron enters one of the detectors and produces an output pulse, it is unlikely another background photon or neutron will enter the other detector at the exact time or within the coincidence resolution time of the coincidence gate. Accordingly, only one pulse will appear at the coincidence gate and this single pulse will not trigger it. Therefore the event will not be counted. However, it is possible for accidental coincidences to occur and to limit their effect upon the count, pulse height gates 42a and 42b are set to accept only those pulses which have a height proportional to the energy of one of the fission neutrons emitted from material A. Since most of the accidental coincidences which might tend to trigger coincidence gate 44b will be due to gamma rays and since the scintillators are preferably as insensitive as possible to gamma rays, most of these gamma ray accidental coincidences will result in pulses of insufficient height to pass through the pulse height gates 42a and 42b. Substantially the only coincidental gamma ray pulses which will pass through the gates will be those resulting from coincidental gamma ray pile-ups, i.e. multiple accidental coincidences producing a pulse large enough to trigger the gate.

If desired, the scintillators of detectors 13c and 13d can be of the type which are sensitive to both fast neutrons and gamma rays. In such case, gates 42a and 42b will be set to accept pulses having a height proportional to one-half the total energy of the fast fission neutrons and the prompt fission gammas and to reject pulses having substantially greater or lesser heights. Such an arrangement would be predicated upon the fact that about one-half of the energy promptly released by the fission reaction would go to each detector and that likewise approximately one-half of the energy released by neutron capture reaction in material A would likewise go to each detector. Since the fission energy is greater than the energy released by the prompt neutron capture reaction, pulses resulting from the latter would be discriminated against by the gates 42a and 42b.

Since the detector systems of this invention must operate to detect fission events in the presence of a background of unwanted radiation, it will be seen from the foregoing that it is usually preferable to use 4 pi geometry and where the separation of the fission pulses from the background radiation pulses is dependent upon their height or total energy content, the pulse height should be accurately proportional to the energy dissipated in the scintillator. The scintillator should be quite transparent and nearly total reflections at surfaces other than the photocathode should be the goal. Proportional response can be achieved to within about 5% by good design and construction, with careful regulation of dynode voltages and other electronic variables. The scintillator volume, should, of course, be large enough to absorb most of the energy associated with the fission event. As stated, the pulse height gate or equivalent will be set to accept pulses characteristics of the fission event and will discriminate against the lower energy background radiation as well as against higher energy cosmic radiation. In all of these arrangements, the electronic circuits should have a short resolving time and in most cases a resolution time of less than one microsecond will be found desirable.

As indicated above, the neutron source should be such that the fast neutrons emitted thereby to be moderated into thermal neutrons, should have an energy below the level of the gates in the particular circuit. Therefore, the fast neutron background largely can be gated out. For example, polonium beryllium and plutonium beryllium sources emit a fast neutron having average energy level of about 4 mev. with a 1 to 5 mev. spectrum. When the total energy of the fission event is detected, it will be obvious that the background of fast neutrons largely can be grated out inasmuch as their maximum energy will be about 5 mev. whereas the total fission neutron and prompt gamma enegry will be greater than that value. In any event, the coincidence techniques employed will prevent counting any fast neutron background pulses that do pass the gates except in the case of neutron pile-ups which will be rare.

It is also contemplated that neutron beams relatively free from fast neutrons can be employed. For example, a time of flight technique can be used in which neutrons are produced by a generator. A gate generator gates the neutron generator on and the detector off. The detector remains off for the short time interval of the fast neutrons (produced by the neutron grenerator and not slowed to thermal levels by the moderator) and gammas, if any, to reach the detector. The detector would then be gated on in time to coincide with the arrival of the slow or thermal neutrons at the material being assayed. In the meantime, the neutron generator would have been gated off. After detection of the fission events, the detector is gated off to complete the cycle. Thus the cycle is: neutron generator on—detector off; neutron generator off—detector off (fast neutrons moving through sample to detector); neutron generator off—detector on (after fast neutrons have arrived at detector, it is turned on before slow neutrons arrive at sample and left on until fission events are detected and then turned off).

The invention has many applications and may be employed to either up-grade or down-grade uranium ore. In FIG. 7 an example of such arrangement is shown. The apparatus of FIG. 1, which includes the conveyor 10 and detector unit 13, is illustrated as combined with two supply conveyors 35 and 36. The conveyor 35 may contain a lower grade of ore particles, while the conveyor 36 may contain ore particles of a higher grade. The particles from the conveyors 35 and 36 are discharged onto the conveyor belt 10 and are passed over the scale 14 and through the unit 13. As explained, an assay of the admixed ore will be continuously made. If the ore is less than the grade desired, the speed of movement of the belts 35 and 36 may be changed so that more high grade ore is deposited upon the belt 10; on the other hand, if the continuous assay being made of the ore or belt 10 indicates that such ore is higher than the grade required, then the speed of the conveyor belts 35 and 36 may be adjusted to deposit additional quantities of the lower grade ore upon belt 10. It is, of course, within the contemplation of the invention that the speed of the belts 35 and 36, which are feeding ore to belt 10, may be varied in accordance with the indications obtained and such variation and control may be entirely automatic through suitable electrical or other control equipment.

From the foregoing it will be seen that a very accurate assaying method has been provided. The ore under investigation is subjected to the bombardment of thermal neutrons which causes the $U^{235}$ in said ore to undergo fission. By suitable detecting means the fission rate is detected and measured and this provides a direct measure of the uranium content of the ore. By making a substantially simultaneous measurement of the weight or mass or flow rate of the ore under investigation and converting this into an electrical signal, the uranium content to mass ratio may be accurately defined. One of the main features of the invention is the fact that it may be carried out continuously and in a very rapid manner.

The method and apparatus is particularly applicable for controlling the ore being conducted to a mill and combined with proper well known automatic mechanism will accurately maintain the desired feed to said mill; also the method may continuously assay the tailing from a mill. Further, initial assay of ore being sold from a producer to a refiner may be accomplished. As a matter of fact since the method is not only extremely accurate but also since it may be operated in a continuous manner it may be used anywhere that assaying of ore is required.

The method and apparatus have been described herein as assaying uranium ore and such uranium ore is particularly adaptable to said method because it contains $U^{235}$ which is an element capable of undergoing fission when bombarded by thermal neutrons. However, it is pointed out that the method may be employed in assaying any ore or material containing an element capable of undergoing fission when subjected to thermal neutron bombardment. For example, uranium ore contains $U^{238}$ and by bombardment of the $U^{238}$ with fast neutrons of proper flux density plutonium can be produced and thereafter, the plutonium which is fissionable may be detected and measured. Similarly, thorium may, by thermal neutron bombardment, produce $U^{233}$ which is fissionable and which may be detected by the present method. The invention thus contemplates the assaying of ore or material containing an element capable of undergoing fission, whereby the content of said element may be ascertained.

In assaying a material containing not only a fissionable component but also other components which vary in relative concentration, there may be instances in which a correction may be desired for the variation in the number of neutron capture reactions. Thus, assuming a constant neutron flux from the source, variation in relative concentration of different contaminants will vary the number of neutrons undergoing capture reactions and hence the net neutron flux available for the fission reaction. Usually this variation in net neutron flux will be small enough to be insignificant but in cases where extreme accuracy is desired, a corrective circuit can be employed. Referring to FIG. 8, gamma compensated neutron detectors 60 and 61 are respectively placed above and below the material A being assayed. These counters may be of the well-known $B^{10}F_3$ type and being gamma compensated, their output will be directly proportional to the number of neutrons reaching each of them. These outputs are fed to ratio circuit 62 wherein they are combined to provide an output signal whose value will be proportional to the ratio of the neutron flux of the beam before it has passed through material A to its flux after it is passed through the material. The resulting ratio signal can be applied as a corrective voltage to scaler 46 to correct its output for variation in the number of neutron capture reactions. The circuit just described is in effect a means for measuring variations in the total capture cross section of material A and for applying a corrective signal to the output of the fission detection means.

This application is a continuation-in-part of copending application Serial No. 577,491, filed April 11, 1956, now abandoned.

From the foregoing it will be seen that this invention is one well adapted to attain all of the ends and objects hereinabove set forth, together with other advantages which are obvious and which are inherent to the apparatus and method.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. The method of assaying a material containing both a fissionab'e component and a component capable of undergoing a thermal neutron capture reaction to emit gammas and the like which comprises, bombarding the material wi.h thermal neutrons at a predetermined flux density, measuring for a finite time the number of pulses having an energy substantially that of the sum of the energies of the prompt fission neutrons and the prompt fission gammas resulting from fission of said component, rejecting from such measurement the pulses having the energy of the gammas and the like resulting from said capture reaction, and correlating the neutron flux density and the measurement of the first-mentioned pulses with time to obtain the amount of the fissionable component content in said material.

2. The method of assaying an ore containing both fissionable $P^{235}$ isotope and a component which is capable of undergoing a thermal neutron capture reaction to emit at least one energized particle having a total energy at least equal to the total energy of the prompt fission neutrons emitted by said $U^{235}$ which comprises, bombarding said ore with thermal neutrons, measuring for a finite time the number of emissive events having a total energy per event substantially that of the sum of the energies of the prompt fission neutrons and the prompt fission gammas emitted by said $U^{235}$, rejecting from such measurement the number of emissive events having a total energy less than said sum, and correlating the neutron flux density and the first mentioned number of emissive events with time to obtain the $U^{235}$ content of the ore.

3. The method of assaying a material containing both a first component capable of undergoing fission to emit a plurality of particles per fission event and a second component capable of reacting with a thermal neutron to emit at least one particle having a total energy content less than the total energy of the particles emitted during a fission event which comprises bombarding said material with thermal neutrons, deriving a signal representing the sum of first component fission events and second component emission events occurring in a finite time during said bombardment, subtracting the number of second component emissive events from said sum, and correlating the remaining fission events with the weight of material bombarded to obtain the content of said first component in said material.

4. The method of assaying a material containing both a first component fissionable to emit a plurality of particles per fission event and a second component capable of reacting with a thermal neutron to emit at least one particle having a total energy content less than the total energy of the particles emitted during the fission event which comprises individually summing for each emissive and fission event the total energy of all the particles emitted during such event to provide a series of pulses having individual magnitudes which are a function of the individual sums of the energies of said particles emitted during each event, and counting only the pulses having a magnitude exceeding those resulting from bombardment of the second component.

5. The method of assaying a material containing both a fissionable component and a non-fissionable component which comprises bombarding the material with particles capable of causing the fissionable component to undergo a nuclear fission reaction in which it simultaneously emits at least two neutrons, the bombardment also causing a background of unwanted radiation consisting of radiative events other than the coincidental emission of neutrons, and counting the number of coincidental emissions of neutrons to obtain a value which is a function of the fission rate and hence of the amount of said fissionable component in said material.

6. The method of assaying a material containing fissionable and non-fissionable components which includes, subjecting material to bombardment by thermal neutrons to cause the fissionable component thereof to undergo fission, and measuring the rate of fission which is proportional to the content of said fissionable component to determine the content of the fissionable component in the material undergoing investigation.

7. The method of assaying a material having a fissionable and non-fissionable component which includes, subjecting an indeterminate mass of said material to bombardment by thermal neutrons to cause the fissionable component thereof to undergo fission, determining the mass of the material undergoing bombardment, measuring the rate of fission, and correlating the measurement of fission rate and the determination of mass to obtain the fissionable component to mass ratio of the material.

8. The method of assaying a material containing both a fissionable and a non-fissionable component which comprises bombarding the material with thermal neutrons to cause the fissionable material to emit particles having an average total energy of a given magnitude and the non-fissionable component to emit particles having an average total energy less than said given magnitude, detecting said particles and forming two trains of pulses, each pulse having a magnitude proportional to one-half of the total energy of the emitted particles which it represents, gating out of the trains of pulses those having a magnitude less than a value intermediate pulses representing the fission event and those representing the non-fissionable component emission, and counting only the remaining pulses which are coexistent in time to obtain a count which is a function of the amount of fissionable component in said material.

9. The method of claim 8 wherein said material is uranium ore.

10. The method of assaying a material containing a fissionable component which comprises bombarding said material with a neutron beam containing both fast and thermal neutrons to cause the fissionable component to undergo a limited fission in which it simultaneously emits at least two fast neutrons per fission event, separately detecting each of the fast fission neutrons and also the fast neutrons from the beam, and counting the fast neutrons which are coexistent within a predetermined short time of each other.

11. An apparatus for determining the uranium content of uranium ore including, a neutron source, means for moving an ore sample past said neutron source in close proximity thereto whereby said ore is bombarded by thermal neutrons to cause fission of the $U^{235}$ isotopes of said ore, and means for determining the rate of fission, whereby the uranium content of the ore sample may be ascertained.

12. An apparatus for determining the uranium content of uranium ore including, a housing having a passage therethrough, means for conducting an ore sample through said passage, means in the housing for directing a thermal neutron beam into contact with the ore sample moving through the housing, whereby the $U^{235}$ isotopes in said sample are caused to undergo fission, electrical measuring means mounted in the housing for measuring the rate of fission and for transposing said measurement into electrical signals, and an indicator actuated by said signals for recording said measurements and providing information as to the uranium content of the ore sample.

13. An apparatus as set forth in claim 11, wherein the means for moving the ore sample comprises a flow conduit extending through the passage in the housing, said ore sample being in solution with a fluid flowing through said conduit.

14. An apparatus for determining the uranium content of uranium ore including, a neutron source, means for moving an ore sample past said neutron source in close proximity thereto whereby said ore is bombarded by thermal neutrons to cause fission of the $U^{235}$ isotopes of said ore, means for determining the weight of the sample under investigation, a source of lower grade ore, a source of higher grade ore, means for admixing the lower grade and the higher grade ores to form the ore sample which is moved past the neutron source, and means for controlling the ratio of lower grade ore to the higher grade ore in accordance with the uranium content to mass ratio of the sample under measurement.

15. An apparatus for determining the uranium content of uranium ore, including a neutron source surrounded by a thermal shield which is further enclosed in cadmium-loaded liquid phosphor, means for moving an ore sample past said neutron source in close proximity thereto whereby said ore is bombarded by thermal neutrons to cause fission of the $U^{235}$ isotopes of said ore, the fission neutrons producing twin pulses, the first of which is due to recoil protons and fission gamma radiation, and the second of which is due to the gamma rays emitted by the cadmium nucleus which captures the neutron after it has been slowed down, a detector for detecting the pulses and for converting the same into electrical signals, means for directing the signal which is representative of the recoil proton to a coincidence circuit, means for directing the second signal which is representative of the neutron-capture gamma to a similar coincidence circuit, and a delayed coincidence circuit electrically connected to the first two mentioned coincidence circuits to effect a fission count.

16. An apparatus for assaying a material containing a fissionable component which comprises means for generating a neutron beam containing thermal neutrons, detection means situated adjacent said generating means for detecting radiation events including those resulting from placing said material in said beam and for forming pulses having a magnitude proportional to the total energy of the radiation event they represent, means connected to the detection means output to gate therefrom pulses having a magnitude less than the average magnitude of those pulses representative of the fission events, and means for counting the output pulses from the gating means.

17. An apparatus for assaying a material containing a fissionable component which comprises means for generating a neutron beam containing thermal neutrons, a pair of detection means each situated adjacent said generating means for detecting radiation events including those resulting from placing said material in said beam and for forming individual outputs comprising pulses having a magnitude proportional to the total energy of the radiation event each pulse represents, means connected to the outputs of the detection means and providing a signal which is proportional to the number of pulses in one detection means output which are coexistent with corresponding pulses in the other detection means output, and means for indicating the magnitude of said signal.

18. The apparatus of claim 17 wherein gating means are provided between the detection means and the means providing said signal to gate out pulses having a magnitude substantially less than those representative of the fission event.

19. The apparatus of claim 18 wherein the generating means also generates fast neutrons having an energy per neutron substantially less than the total energy of the particles promptly emitted during one fission event occurring in the material being assayed.

20. An apparatus for assaying a material containing a fissionable material which comprises a neutron generator for generating a beam containing thermal neutrons, a pair of detectors each situated adjacent said generator for detecting radiation events including those resulting from placing said material in said beam, said detectors being substantially insensitive to gamma radiation but sensitive to fast neutrons, coincidence means connected to the output of each of the detectors and providing an output proportional to the number of pulses respectively substantially simultaneously occurring in each of the outputs of the detectors, and means for indicating the magnitude of the output from the coincidence means.

21. The apparatus of claim 20 in combination with mean for measuring the flux density of said neutron beam both before and after it has passed through said material and providing an output representative of the change in flux density, said output being connected to correct the output from said coincidence means for any change in flux density.

22. The apparatus of claim 20 wherein the detectors each include a scintillator which scintillators are optically isolated from each other, the scintillators being symmetrically arranged with respect to said material when it is in said neutron beam.

References Cited in the file of this patent
UNITED STATES PATENTS

| | | |
|---|---|---|
| 2,597,535 | Segre | May 20, 1952 |
| 2,617,526 | Lapointe | Nov. 11, 1952 |
| 2,717,693 | Holmes | Sept. 13, 1955 |
| 2,750,144 | Beckwith | June 12, 1956 |
| 2,768,134 | Fermi et al. | Oct. 23, 1956 |